(12) United States Patent
Kellner et al.

(10) Patent No.: US 12,122,311 B2
(45) Date of Patent: Oct. 22, 2024

(54) MOTOR VEHICLE BODY HAVING A BATTERY COMPARTMENT, MOTOR VEHICLE

(71) Applicant: Dr. Ing. h.c. F. Porsche Aktiengesellschaft, Stuttgart (DE)

(72) Inventors: Philipp Kellner, Rennigen (DE); Sascha Mostofi, Zeltingen (DE); Christopher Volkmer, Niefern-Oeschelbronn (DE); Dieter Schiebel, Korntal-Muenchingen (DE); Immanuel Vogel, Kornwestheim (DE); Jan Hogenmueller, Leonberg (DE); Jan Kretzschmar, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 372 days.

(21) Appl. No.: 17/578,494

(22) Filed: Jan. 19, 2022

(65) Prior Publication Data
US 2022/0242344 A1 Aug. 4, 2022

(30) Foreign Application Priority Data
Feb. 1, 2021 (DE) ...................... 10 2021 102 198.7

(51) Int. Cl.
*B60R 16/04* (2006.01)
*B62D 25/02* (2006.01)

(52) U.S. Cl.
CPC ............ *B60R 16/04* (2013.01); *B62D 25/025* (2013.01)

(58) Field of Classification Search
CPC ......................... B62D 25/082; B62D 25/2018; B62D 25/081; B62D 25/2045; B62D 21/152;
(Continued)

(56) References Cited

U.S. PATENT DOCUMENTS

| 6,568,747 | B2 * | 5/2003 | Kobayashi | ........... B62D 21/157 296/203.03 |
| 7,290,811 | B1 * | 11/2007 | Arns | ........................ B60R 19/24 293/133 |

(Continued)

FOREIGN PATENT DOCUMENTS

| CN | 105857045 A | | 8/2016 | |
| CN | 109204470 A | * | 1/2019 | ............. B62D 21/02 |

(Continued)

OTHER PUBLICATIONS

Translation of KR-20200080706-A accessed at www.espacenet.com on Mar. 17, 2024. (Year: 2020).*

*Primary Examiner* — John D Walters
*Assistant Examiner* — Hilary L Johns
(74) *Attorney, Agent, or Firm* — LEYDIG, VOIT & MAYER, LTD.

(57) ABSTRACT

A motor vehicle body for a motor vehicle includes a battery compartment, a sill, a crossmember arranged in front of the battery compartment in a direction of travel and orthogonally with respect to the sill, and a longitudinal member arranged in front of the crossmember in the direction of travel. A sheet-metal shell is arranged in front of the crossmember between the longitudinal member and an end side of the crossmember.

15 Claims, 3 Drawing Sheets

(58) Field of Classification Search
CPC .... B62D 21/157; B62D 25/02; B62D 25/025; B62D 25/04; B62D 25/08; B62D 25/088; B62D 25/14; B62D 25/2027; B62D 25/2036; B60R 19/34; B60R 16/04
USPC .......................................................... 180/68.5
See application file for complete search history.

(56) References Cited

U.S. PATENT DOCUMENTS

| | | | | |
|---|---|---|---|---|
| 8,573,683 | B2* | 11/2013 | Gadhiya | B62D 21/152 |
| | | | | 296/203.02 |
| 9,630,578 | B1* | 4/2017 | Nusier | B60R 19/12 |
| 10,843,648 | B2* | 11/2020 | Zierer | B62D 21/152 |
| 10,899,391 | B2 | 1/2021 | Bokeloh et al. | |
| 2003/0189358 | A1* | 10/2003 | Watanabe | B62D 25/2045 |
| | | | | 296/203.02 |
| 2012/0119542 | A1* | 5/2012 | Mildner | B62D 25/2018 |
| | | | | 296/187.09 |
| 2012/0175899 | A1* | 7/2012 | Gadhiya | B62D 25/20 |
| | | | | 293/132 |
| 2019/0210653 | A1* | 7/2019 | Bokeloh | B62D 25/082 |
| 2019/0256021 | A1* | 8/2019 | Zierer | B62D 21/152 |

FOREIGN PATENT DOCUMENTS

| | | | |
|---|---|---|---|
| CN | 109803875 A | | 5/2019 |
| CN | 111660786 A | | 9/2020 |
| DE | 10316205 A1 | | 11/2003 |
| DE | 10240474 A1 | | 3/2004 |
| DE | 102010051271 A1 | | 5/2012 |
| DE | 102013008657 A1 | | 11/2014 |
| EP | 3529132 B1 | | 8/2020 |
| KR | 20200080706 A | * | 7/2020 |

* cited by examiner

MOTOR VEHICLE BODY HAVING A BATTERY COMPARTMENT, MOTOR VEHICLE

CROSS REFERENCE TO RELATED APPLICATIONS

This application claims benefit to German Patent Application No. DE 10 2021 102 198.7, filed on Feb. 1, 2021, which is hereby incorporated by reference herein.

FIELD

The present invention relates to a motor vehicle body for a motor vehicle, having a battery compartment, and to a motor vehicle.

BACKGROUND

In modern electrically or partially electrically operated motor vehicles, the high-voltage battery for the electrical supply of the drive train is typically arranged in the region of the floor of the motor vehicle. The battery compartment provided for this purpose reaches partially as far as directly behind the front crossmember of the motor vehicle body of the motor vehicle.

In the event of a head-on collision, the front crossmember of the motor vehicle body, as known, for example, from the document DE 10 2013 008 657 A1, obtains an important task. By means of a specific deformation of the crossmember, crash energy is dissipated, and therefore those involved in the accident are protected. For example, in the event of a head-on impact, a front wheel of the motor vehicle may be pushed against the wheelhouse shell. In the event of very high crash energies, it is possible for the front wheel to be separated from the rest of the motor vehicle and then be removed from the motor vehicle in an uncontrolled manner. In order to dissipate as much crash energy as possible before the front wheel is torn off, the crossmember located behind the wheelhouse shell can be deformed.

Furthermore, it is possible that, at very high crash energies, parts in the front region of the motor vehicle will be detached and pushed in an uncontrolled manner against the end wall or the crossmember of the body.

A problem in this case is deformation of the crossmember to such an extent that the battery compartment located behind the crossmember is deformed or the crossmember is even perforated. This can lead to damage of the high-voltage battery which in turn involves a risk of fire.

SUMMARY

In an embodiment, the present disclosure provides a motor vehicle body for a motor vehicle having a battery compartment, a sill, a crossmember arranged in front of the battery compartment in a direction of travel and orthogonally with respect to the sill, and a longitudinal member arranged in front of the crossmember in the direction of travel, wherein a sheet-metal shell is arranged in front of the crossmember between the longitudinal member and an end side of the crossmember.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
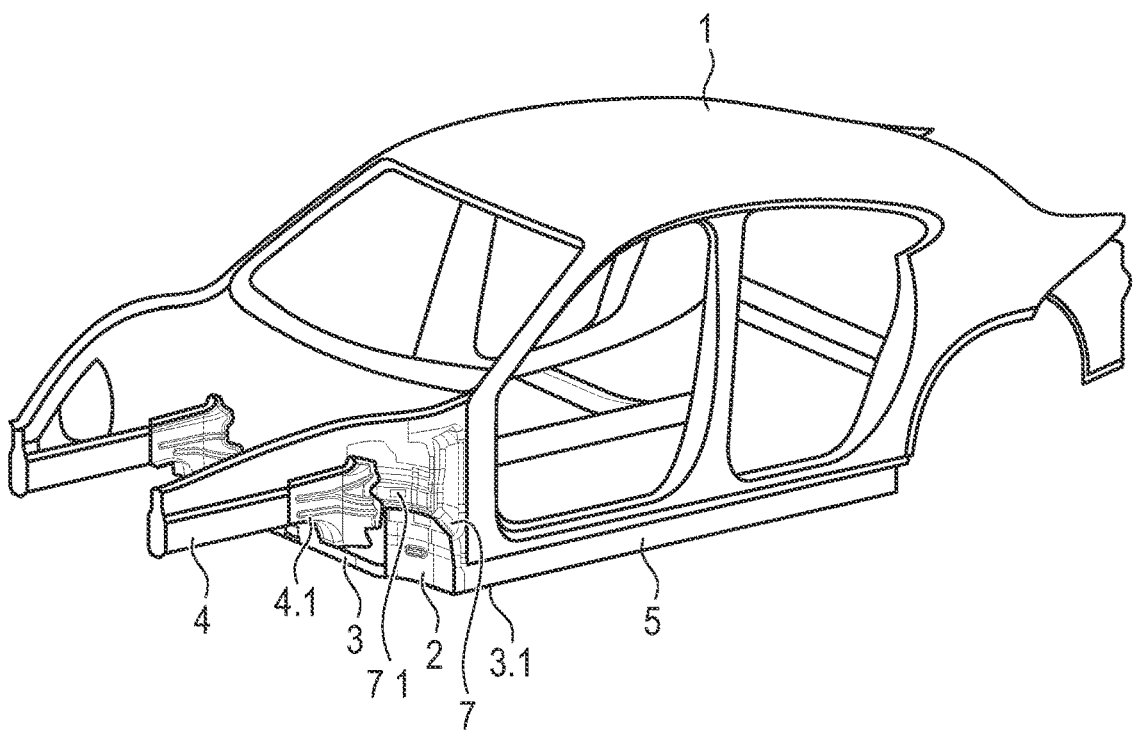
FIG. 1 schematically illustrates a motor vehicle body according to an embodiment of the present invention.

In an embodiment, the present invention provides a motor vehicle body for a motor vehicle, having a battery compartment, a sill, a crossmember arranged in front of the battery compartment in the direction of travel and orthogonally with respect to the sill, and a longitudinal member arranged in front of the crossmember in the direction of travel, within a sheet-metal shell is arranged in front of the crossmember between the longitudinal member and an end side of the crossmember.

The motor vehicle body according to the invention makes it possible, in the event of a head-on collision, to reduce deformation of the battery compartment and to reduce the risk of perforation of the crossmember. The sheet-metal shell here absorbs crash energy acting in particular in punctiform fashion on the crossmember and introduces same extensively into the crossmember.

A battery compartment within the context of the present invention is a motor vehicle body compartment which is provided for the arrangement of a high-voltage battery. A sheet-metal shell within the context of the present invention is a flat metallic object. Directional details, such as in front of, behind or laterally, refer to the direction of travel. The crossmember is joined to a front end wall of the motor vehicle body. The longitudinal member is joined to the front end wall. The crossmember is joined to the sill. In some embodiments, it is provided that the sheet-metal shell at least partially lines the crossmember.

Advantageous refinements and developments of the invention can be gathered from the dependent claims and from the description with reference to the drawings.

According to an embodiment of the invention, it is provided that the end side is arranged flush with the sill. The crossmember therefore ends laterally with the sill. This advantageously permits the crossmember to be supported flat against the entire cross section of the sill.

According to an embodiment of the invention, it is provided that the sheet-metal shell is manufactured from a high-strength steel by heat forming. It is thereby advantageously possible to very substantially prevent perforations of the sheet-metal shell and therefore extreme loadings of the crossmember leading as far as perforating the crossmember.

According to an embodiment of the invention, it is provided that the sheet-metal shell is arranged directly adjacent to the end side and in some embodiments directly adjacent to the longitudinal member. It is thus advantageously possible for energy to be absorbed over a very large area between the longitudinal member and lateral outer side of the motor vehicle with the sheet-metal shell and to be dispensed again in a controlled manner over a large surface area.

According to an embodiment of the invention, it is provided that the sheet-metal shell has a cutout 8 for attaching the longitudinal member to the motor vehicle body. This makes it advantageously possible to arrange the sheet-metal shell around the attachment of the longitudinal area such that more area is covered by the sheet-metal shell.

According to an embodiment of the invention, it is provided that the sheet-metal shell is arranged directly adjacent to a longitudinal member mount for attaching the longitudinal member to the motor vehicle body or at least partially surrounding the longitudinal member mount, wherein the sheet-metal shell may be joined to the longitudinal member mount. By this means, the stability of the sheet-metal shell, in particular the local strength thereof in the event of an accident, is advantageously increased and the area of the sheet-metal shell for absorbing crash energy is increased.

According to an embodiment of the invention, it is provided that the sheet-metal shell is arranged at least partially surrounding the end side. The effect advantageously achieved by this is a partial encapsulation of the crossmember by the sheet-metal shell, as a result of which a particularly efficient and precisely directed transmission of energy from the sheet-metal shell to the crossmember is possible.

According to an embodiment of the invention, it is provided that the crossmember is provided to be deformable in the direction of travel in a manner increasing from the longitudinal member toward the end side. This advantageously ensures that, in the event of the front wheel being torn off in front of the crossmember, the front wheel is diverted to the side. If the crossmember is deformed more in the vicinity of the sill than further in the center of the vehicle, the sheet-metal shell bends about the vertical axis of the motor vehicle. The sheet-metal shell then becomes a diverting surface via which the front wheel can slide away outward. It is conceivable for the deformability of the crossmember to be set by its material composition and/or cross section and/or wall thickness and/or structure.

According to an embodiment of the invention, it is provided that the sheet-metal shell is arranged at least partially surrounding the sill. This advantageously produces an at least partial encapsulation of the crossmember and the possibility of transmitting force from the sheet-metal shell to the sill.

According to an embodiment of the invention, it is provided that the sheet-metal shell is joined to the crossmember and/or to the sill, wherein the sheet-metal shell may be provided as a tension strap which holds together the crossmember and the sill. This advantageously permits a high degree of stability and in particular positional strength of the sheet-metal shell relative to the crossmember or to the sill, as a result of which a very precise introduction of force into the sill is possible.

According to an embodiment of the invention, it is provided that the motor vehicle body has a front end wall, wherein the sheet-metal shell is joined to the front end wall, wherein the front end wall may have an end wall crossmember and the sheet-metal shell is joined to the end wall crossmember. It is thereby advantageously possible for the sheet-metal shell to at least partially line the front end wall and therefore to protect the region located behind the front end wall, in particular the battery compartment arranged behind the end wall and the end wall carrier, against deformations and perforations.

According to an embodiment of the invention, it is provided that the sheet-metal shell is joined to the longitudinal member. This permits a particularly good positional strength and tearing-off safety of the sheet-metal shell, for example in the event of increased deformation of the crossmember in the region of the sill for diverting the front wheel.

In order to achieve the object formulated at the beginning, the present invention furthermore relates to a motor vehicle having a motor vehicle body according to the invention.

All the details, features and advantages disclosed previously in conjunction with the motor vehicle body according to the invention likewise relate to the motor vehicle according to the invention.

FIG. 1 schematically illustrates a motor vehicle body 1 according to an embodiment of the present invention. The motor vehicle body 1 illustrated here has a box-type body shell with two sills 5 arranged along the direction of travel F. The motor vehicle body 1 is constructed substantially symmetrically. For the sake of simplicity, only the driver-side features are referred to and described here. However, all the details disclosed relate both to the driver's side and to the front passenger's side of the motor vehicle body 1.

Transversely with respect to the sill 5, the motor vehicle body 1 has a front end wall 7 with an end wall crossmember 7.1. A longitudinal member mount 4.1 for the mounting of a longitudinal member 4 is joined to the front end wall 7. Also arranged transversely with respect to the sill 5 is a crossmember 3 which, with its end side 3.1, ends flush with the sill 5. Behind the crossmember 3 and the front end wall 7, a battery compartment (not visible here, see FIG. 3) for receiving a high-voltage battery for the electrical supply of a drive train is provided.

In the event of a head-on impact, the components of the motor vehicle body 1 carry out important tasks. To protect the participants in the accident, crash energy is dissipated by targeted deformation of the motor vehicle body 1. In particular, the crossmember 3 is provided for deformation in the event of an accident, for example in order to absorb the energy of a front wheel pushed onto the crossmember 3 from the front.

Figure 5:
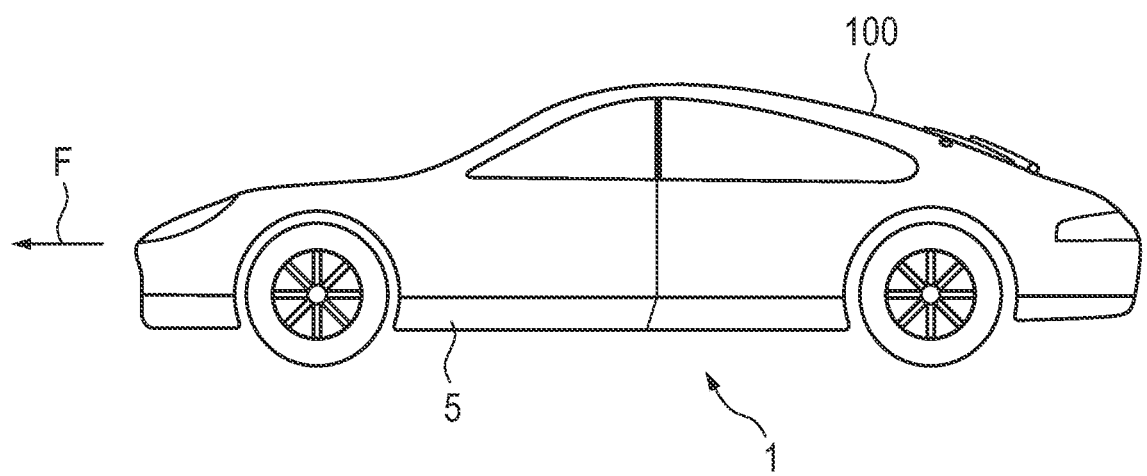
FIG. 5 schematically illustrates a motor vehicle according to an embodiment of the present invention.

High-voltage batteries are accident-sensitive components of a motor vehicle (see FIG. 5). Damage to the high-voltage battery can trigger fires which can be distinguished only with difficulty and should be avoided as far as possible. In order to avoid locally increased admissions of the crash energy into the crossmember 3 and therefore to prevent severe local deformations of the battery compartment or even perforation of the crossmember 3 with the risk of damage in the high-voltage battery, the motor vehicle body 1 has a sheet-metal shell 2 made from a high-strength metal. The sheet-metal shell 2 is arranged in the direction of travel F in front of the crossmember 3 and in front of the front end wall 7 between the longitudinal member mount 4.1 and the end side 3.1 of the crossmember 3, with the sheet-metal shell 2 here partially encasing the end side 3.1. The sheet-metal shell 2 is adapted to the contour of the crossmember 3 and of the end wall crossmember 7.1 by means of a heat forming method and joined, for example welded or riveted, to the crossmember 3 and to the end wall crossmember 7.1. It is also conceivable for the sheet-metal shell 2 to be joined to the longitudinal member mount 4.1 and/or to the sill 5.

Figure 2:
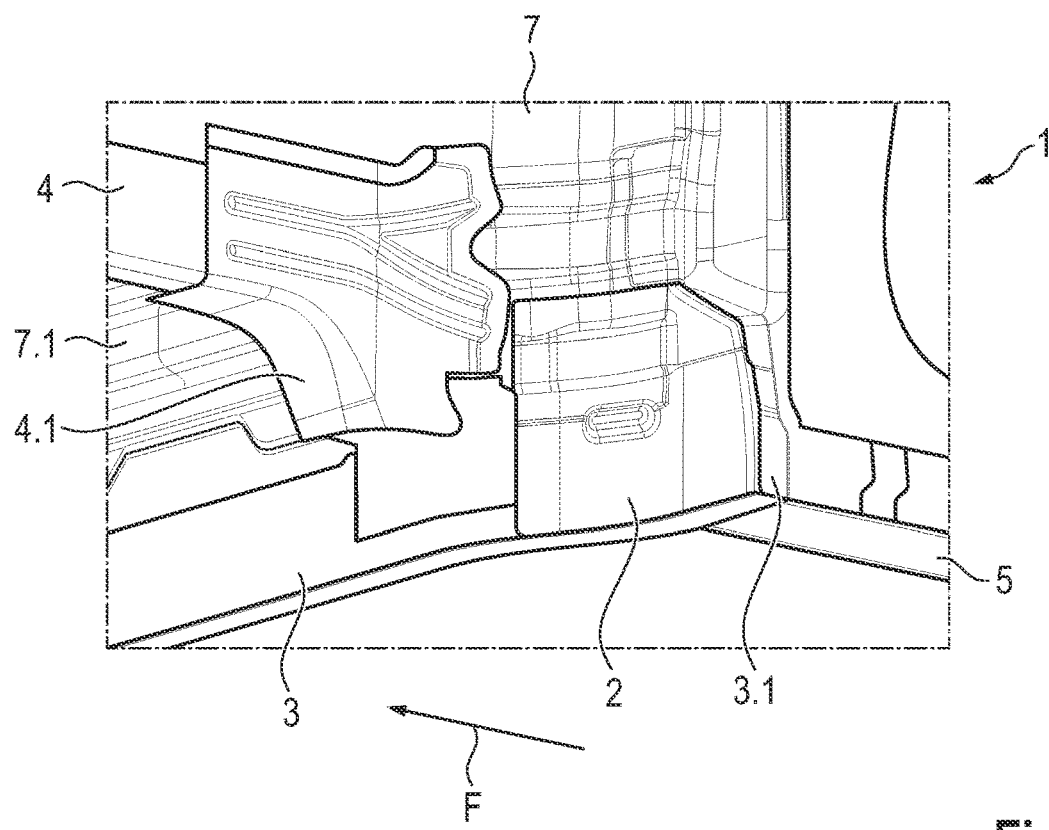
FIG. 2 schematically illustrates a detail of a motor vehicle body according to an embodiment of the present invention.

FIG. 2 schematically illustrates a detail of a motor vehicle body 1 according to an embodiment of the present invention looking obliquely from the bottom. The sheet-metal shell 2 and the crossmember 3 which is arranged orthogonally with respect to the direction of travel F and has the end side 3.1 can be seen. It can readily be seen how the sheet-metal shell 2 partially surrounds the end side 3.1. Furthermore, the longitudinal member 4, the longitudinal member mount 4.1, the sill 5, and the front end wall 7 with the end wall crossmember 7.1 can be seen.

Figure 3:
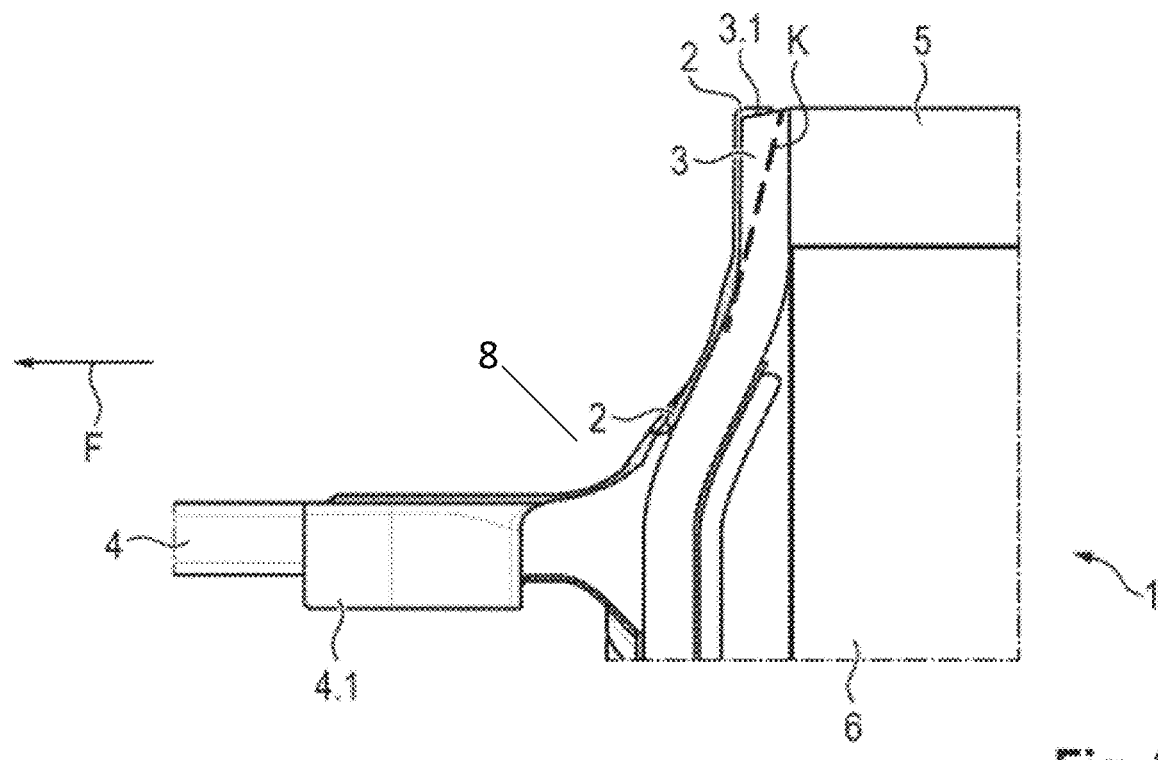
FIG. 3 schematically illustrates a detail of a motor vehicle body according to an embodiment of the present invention.

FIG. 3 schematically illustrates a detail of a motor vehicle body 1 according to an embodiment of the present invention. The motor vehicle body 1 from FIG. 2 can be seen looking from the bottom. The battery compartment 6 is shown in the direction of travel F behind the sheet-metal shell 2 and the crossmember 3. The longitudinal member 4 with the longitudinal member mount 4.1 can furthermore be seen.

It can readily be seen in this illustration how the end side 3.1 of the crossmember 3 ends flush with the sill 5. The crossmember 3 is designed to be deformable, with its deformability increasing from the center of the motor vehicle body 1 toward the end side 3.1 transversely with respect to the direction of travel F. In the event of a head-on impact, in particular in the event of a head-on impact with a small impact surface which is arranged substantially on the side of the motor vehicle body 1, the front wheel (not shown) of the motor vehicle is pushed against the wheelhouse and therefore presses against the sheet-metal shell 2 and the crossmember 3. In the event of very high crash energies, the front wheel may tear off. In order to conduct the front wheel away from the battery compartment 6 in such a case, the crossmember 3 with the sheet-metal shell 2 in the region of the end side 3.1 is deformed more greatly than in the region of the longitudinal member mount 4.1. It forms a crash contour K which conducts the front wheel out of the wheelhouse.

Figure 4:
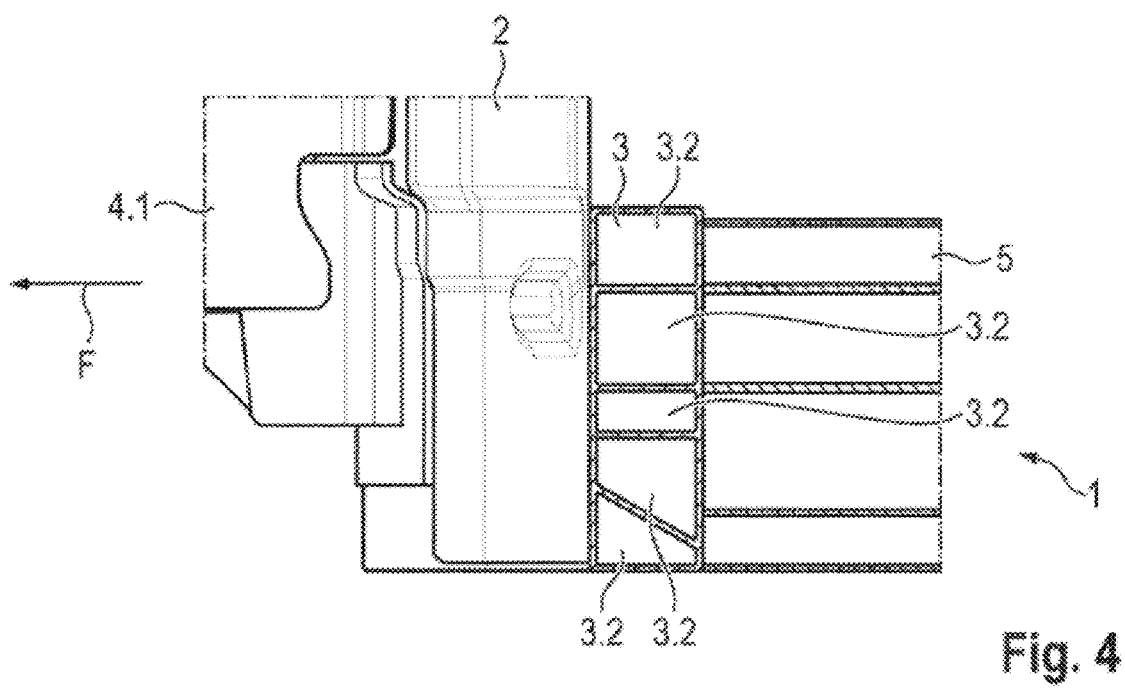
FIG. 4 schematically illustrates a detail of a motor vehicle body according to an embodiment of the present invention.

FIG. 4 schematically illustrates a detail of a motor vehicle body 1 according to an embodiment of the present invention. A cross-sectional view of part of the motor vehicle body 1 from the side with the longitudinal member mount 4.1, the sheet-metal shell 2, the sill 5 and the crossmember 3 can be seen. The inner structure of the crossmember 3 that has individual member chambers 3.2 formed by a framework can clearly be seen. The deformability of the crossmember 3 can be varied by the configuration of the framework, for example by the size of the member chambers 3.2.

FIG. 5 schematically illustrates a motor vehicle 100 according to an embodiment of the present invention with a motor vehicle body 1 according to an embodiment of the present invention. The sill 5 can be seen.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Motor vehicle body
2 Sheet-metal shell
3 Crossmember
3.1 End side
3.2 Member chambers
4 Longitudinal member
4.1 Longitudinal member receptacle
5 Sill
6 Battery compartment
7 Front end wall
7.1 End wall crossmember
100 Motor vehicle
F Direction of travel
K Crash contour

The invention claimed is:

1. A motor vehicle body for a motor vehicle, comprising: a battery compartment, a sill, a crossmember arranged in front of the battery compartment in a direction of travel and orthogonally with respect to the sill, and a longitudinal member arranged in front of the crossmember in the direction of travel, wherein a sheet-metal shell is arranged in front of the crossmember between the longitudinal member and an end side of the crossmember.

2. The motor vehicle body as claimed in claim 1, wherein the end side is arranged flush with respect to the sill.

3. The motor vehicle body as claimed in claim 1, wherein the sheet-metal shell is manufactured from a high strength steel by heat forming.

4. The motor vehicle body as claimed in claim 1, wherein the sheet-metal shell is arranged directly adjacent to the end side and directly adjacent to the longitudinal member.

5. The motor vehicle body as claimed in claim 1, wherein the sheet-metal shell has a cutout for attaching the longitudinal member to the crossmember of the motor vehicle body.

6. The motor vehicle body as claimed in claim 1, wherein the sheet-metal shell is arranged directly adjacent to a longitudinal member mount for attaching the longitudinal member to the motor vehicle body or at least partially surrounding the longitudinal member mount, wherein the sheet-metal shell is joined to the longitudinal member mount.

7. The motor vehicle body as claimed in claim 1, wherein the sheet-metal shell is arranged at least partially surrounding the end side.

8. The motor vehicle body as claimed in claim 1, wherein the crossmember is provided to be deformable in the direction of travel in a manner increasing from the longitudinal member toward the end side.

9. The motor vehicle body as claimed in claim 1, wherein the sheet-metal shell is arranged at least partially surrounding the sill.

10. The motor vehicle body as claimed in claim 1, wherein the sheet-metal shell is joined to the crossmember or to the sill, wherein the sheet-metal shell is provided as a tension strap which holds together the crossmember and the sill.

11. The motor vehicle body as claimed in claim 1, wherein the motor vehicle body has a front end wall, wherein the sheet-metal shell is joined to the front end wall, wherein the front end wall has an end wall crossmember and the sheet-metal shell is joined to the end wall crossmember.

12. The motor vehicle body as claimed in claim 1, wherein the sheet-metal shell is joined to the longitudinal member.

13. The motor vehicle having a motor vehicle body as claimed in claim 1.

14. The motor vehicle body as claimed in claim 11, wherein the sheet-metal shell is adapted to a first contour of the crossmember and a second contour of the end wall crossmember by a heat forming method.

15. The motor vehicle body as claimed in claim 1, wherein the battery compartment is arranged behind the crossmember and the sheet-metal shell in the direction of travel.

\* \* \* \* \*